(12) United States Patent
Poetsch et al.

(10) Patent No.: US 7,657,411 B2
(45) Date of Patent: Feb. 2, 2010

(54) METHOD FOR TRANSFORMATION OF ENTERPRISE MODELS TO BUSINESS PROCESS MODELS

(75) Inventors: Stefan A. Poetsch, Limburg (DE); Ulrike B. Greiner, Eggenstein-Leopoldshafen (DE); Sonia Lippe, Hill End (AU)

(73) Assignee: SAP AG, Waldorf (DE)

( * ) Notice: Subject to any disclaimer, the term of this patent is extended or adjusted under 35 U.S.C. 154(b) by 578 days.

(21) Appl. No.: 11/333,911

(22) Filed: Jan. 17, 2006

(65) Prior Publication Data

US 2007/0179821 A1    Aug. 2, 2007

(51) Int. Cl.
G06G 7/48    (2006.01)

(52) U.S. Cl. .................. 703/6; 717/102; 717/104; 705/7

(58) Field of Classification Search .............. 703/6; 705/7
See application file for complete search history.

(56) References Cited

U.S. PATENT DOCUMENTS

| | | | |
|---|---|---|---|
| 5,956,499 A * | 9/1999 | Colgan ................... | 703/2 |
| 6,067,548 A * | 5/2000 | Cheng ................... | 707/103 R |
| 6,973,638 B1 * | 12/2005 | Gangopadhyay et al. ... | 717/104 |
| 7,222,302 B2 * | 5/2007 | Hauser et al. ........... | 715/734 |
| 7,370,315 B1 * | 5/2008 | Lovell et al. ........... | 717/100 |
| 7,503,033 B2 * | 3/2009 | Meredith et al. ........ | 717/104 |
| 2004/0015819 A1 * | 1/2004 | Romano-Critchley et al. ................. | 717/102 |
| 2004/0249645 A1 * | 12/2004 | Hauser et al. ........... | 705/1 |
| 2006/0168555 A1 * | 7/2006 | Represas Ferrao et al. .. | 717/104 |

OTHER PUBLICATIONS

Matthias Born et al., "Semantic Annotation and Composition of Business Processes with Maestro". Springer Berlin/Heidelberg, Lecture Notes on Computer Science, the Semantic Web: Research and Applications, pp. 772-776; May 2008.*
Dufresne et al, "Process Modeling for E-Business", INFS 770-Methods for Information Systems Engineering: Knowledge Management and E-Business, George Mason University, Spring 2003.*
Adam et al, "A Collaboration Framework for Cross-enterprise Business Process Management"; Proceedings of the 1st International Conference on Interoperability of Enterprise Software and Applications, Geneva, Switzerland, Feb. 23-25, 2005.*
Nelson, Mark, "Enterprise Architecture Modernization Using the Adaptive Enterprise Framework", BPTrends, Jan. 2004.*
Zhao et al, "Transforming Business Processes Models: Enabling Programming at a Higher Level", IEEE SCC, 2005.*
"European Office Action, Application No. 06025742.5", (Mar. 30, 2007), 6 pgs.

* cited by examiner

Primary Examiner—Paul L Rodriguez
Assistant Examiner—Mary C Jacob
(74) Attorney, Agent, or Firm—Schwegman, Lundberg & Woessner, P.A.

(57) ABSTRACT

A transformation method is described having three phases. The first phase provides a tool and language independent annotation framework to capture semantics of entities as well as their relationships with other entities. The second phase converts the entities on the business level into corresponding entities on a technical level. The conversion preserves the semantics of the entities defined at the business level and transforms them into a representation implementable at the technical level. The third phase reassembles the transformed entities into a cross-organizational business process in a desired technical modeling language and tool.

14 Claims, 12 Drawing Sheets

METHOD FOR TRANSFORMATION OF ENTERPRISE MODELS TO BUSINESS PROCESS MODELS

TECHNICAL FIELD

Various embodiments relate generally to the fields of modeling, and in particular, but not by way of limitation, to a system and method for transformation of enterprise models to technical cross-organizational business process models.

BACKGROUND

Using enterprise models, where business knowledge is available from domain experts and captured, enables the design of cross organizational business processes (CBP). A process view concept has been identified as an appropriate approach for the execution of CBPs. Current modeling cross organizational business processes, therefore, requires two levels of modeling: a business level, where major business modeling tools are applied and a technical level, where technical tools and modeling languages are applied. The main difference between both is that enterprise models may contain elements that are not executable in information and computing technology (ICT) systems. For example in an enterprise model a truck drives from A to B, whereas in a technical model this operation needs to be transformed into appropriate ICT system tasks.

As such, two levels of modeling exist that require two different models. To ensure that process execution meets end-user requirements and implements the process as specified by the end-user, process transformation from the business level to the technical level is necessary. Currently this can be done manually which leads to information loss between the modeling levels and high costs through redundant modeling activities.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Disclosed herein are various embodiments of the present invention for providing an annotation-based transformation to facilitate the transformation of enterprise models into technical business processes in a cross organizational context.

In one embodiment, a transformation method includes three phases. The first phase provides a tool and language independent annotation framework. The main objective of the annotation framework is to capture semantics of single entities as well as their relationships with other entities. Based on the annotation framework, the second phase focuses on the conversion of every single entity on the business level into the according entity on the technical level. The conversion preserves the semantics of the entities defined at the business level and transforms them into a representation implementable at the technical level. After the conversion, the third phase reassembles the transformed entities into a cross-organizational business process in a desired technical modeling language and tool. This embodiment can be executed in software for automated model transformation between business and technical levels.

The annotation and transformation method provides several advantages and improvements over the existing manual approach. First, the methods support a systematic approach that can be implemented in a software tool. This reduces information loss and errors that may occur during manual transformation. In addition, business knowledge specified in the enterprise models is preserved when generating the process models for the technical level. Changes in the business level models can be propagated to the technical level models without requiring an additional expert that adapts the technical level models. Thus, maximum re-use of process models is supported. An implementation of the disclosed embodiments can increase efficiency and reduces collaboration set up costs. Finally, the methods are independent of the enterprise and technical process modeling tool and language used. The adaptation to specific models is done during implementation of the method. The method can be used for different enterprise modeling languages and tools and also for different tools at technical level and makes it generally applicable.

Enterprise modeling can be defined as the art of externalizing enterprise knowledge. Enterprise models should depict the enterprise in terms of its organization and operations, i.e. resources, processes, or organizational responsibilities. Enterprise modeling languages should allow building those models in terms of processes, function and activities in an integrated way.

Figure 1:
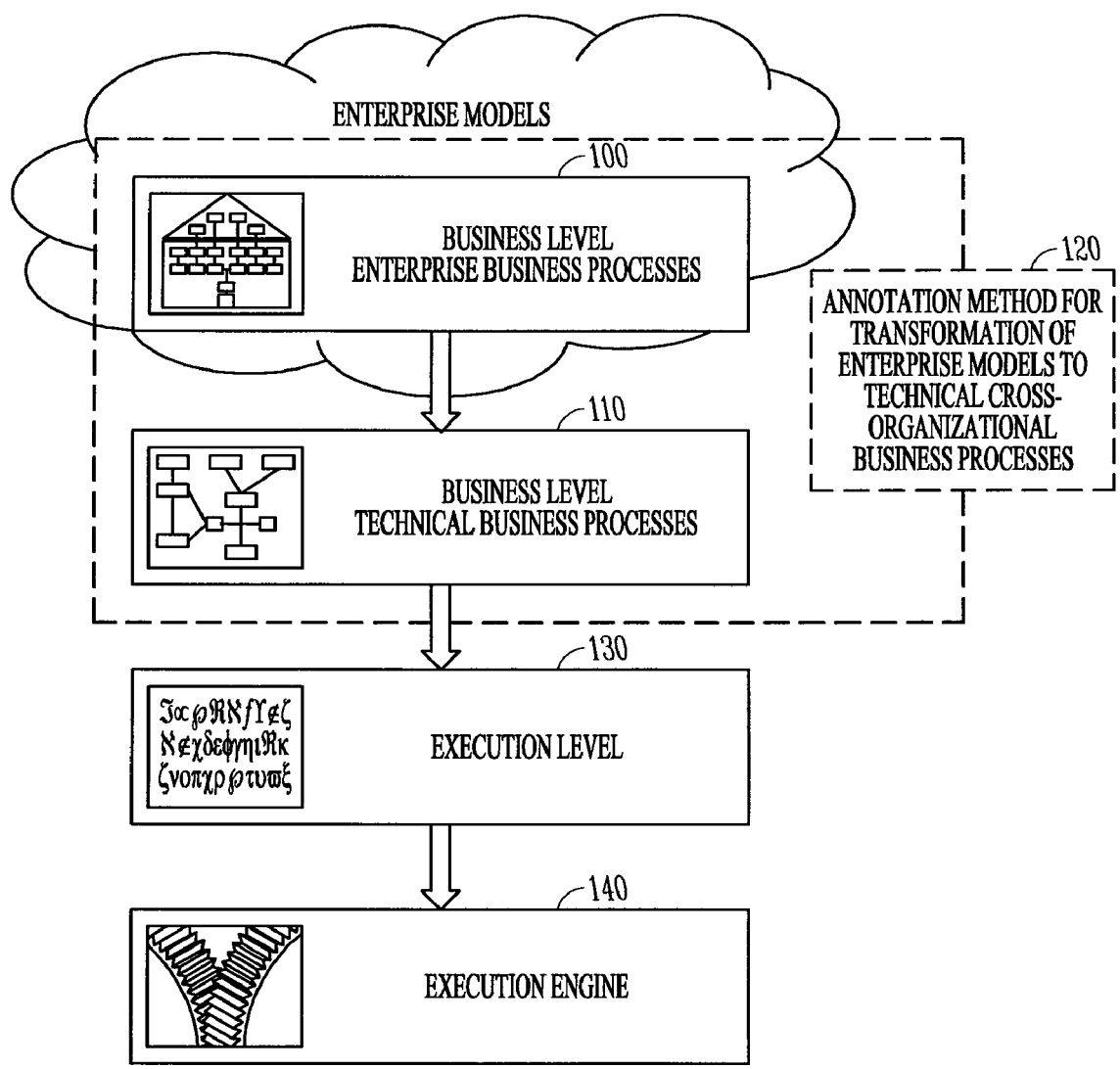
FIG. 1 illustrates levels of business process modeling.

Referring to FIG. 1, different user groups and modelers are involved in enterprise and business process modeling. Those different user groups have different perspectives and needs reflected in the use of different modeling languages and tools. For example, a model that is meant to be for an IT—specialist is probably difficult or cannot be understood from business analysts. Therefore different levels of modeling are suggested for different purposes, such as enterprise business process, technical business processes and executable process model levels.

Enterprise business processes 100 are computational independent processes. Computational independent means that those processes are designed regardless of their executability within an ICT system. Applied enterprise modeling languages at this level can include, for example, extended Event Driven Process Chain (eEPC) or Integrated Enterprise Modeling (IEM).

Technical business processes 110 provide a more detailed view especially on the enterprise processes 100. All activities represented at this level are technical and thus executable within an ICT system. Non executable objects or activities, such as 'Truck drives from A to B' are replaced or eliminated, as explained below. However, the control flow of the process is still modeled in a platform independent manner, which supports the reuse of models. An example of a modeling language and tool applied at this level is Maestro. An annotation process 120 is provided, as described below, to transform the business model to the technical model.

An execution level 130 is where the business process is modeled in a concrete language of an execution engine 140. A widely accepted modeling standard at this level is Web Services Business Process Execution Language (WS-BPEL). These models represent an implementation and can be converted into program code and thus are executable by an execution engine.

Figure 2:
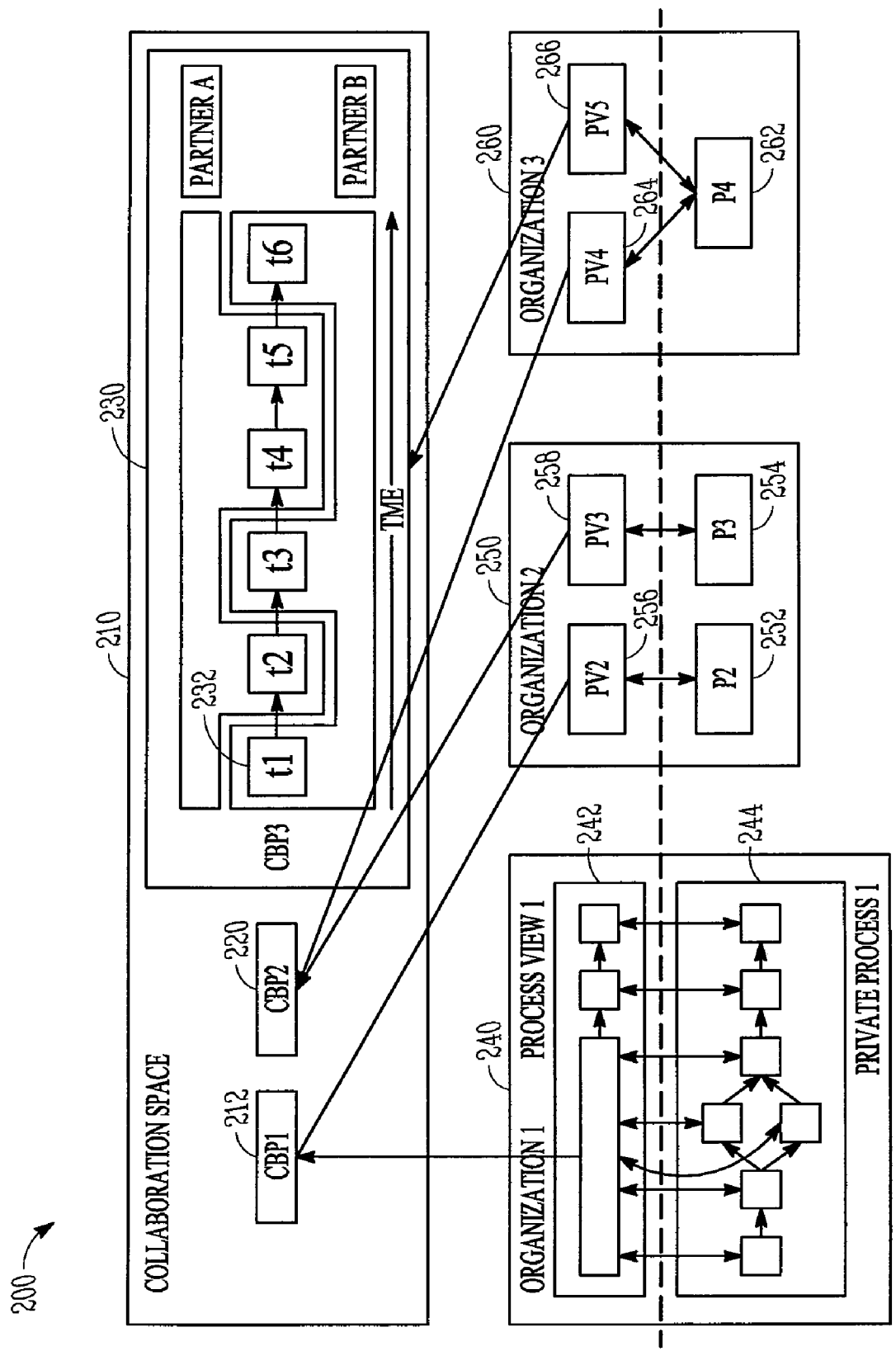
FIG. 2 illustrates cross organizational business modeling.

As stated above embodiments described herein can be particularly useful in cross organizational business processes. The concept of cross organizational business process modeling is described herein to more fully appreciate the present invention. Referring to FIG. 2, a representative organization 200 is described that includes three organizations 240, 250 and 260 which operate together in a collaboration space 210. Each organization can include different Private Processes (PP) 242, 252, 254 and 262 and Process Views (PV) 244, 256, 258, 264 and 266. The PP's are internal processes of a specific enterprise and contain confidential information. All tasks within that model are considered private.

A process view represents an abstraction of a PP model and is created for collaboration purpose. All information contained in the PV model is considered public and those notations offer interaction points to model Cross Organizational Business Processes (CBP) 212, 220 and 230. A main difference between the process view and a private process is that several private tasks can be merged into one process view task. This allows enterprises to protect internal confidential information. A process view is executed through its private processes. Therefore a reference has to exist between both the process view and private process view.

Cross Organizational Business Processes 212, 220 and 230 define the interaction between enterprises and business partners, and are constructed by interweaving the different process views of the organizations into technical models, for example process 232. Because two levels of modeling exist, two different models are required. To ensure that process execution meets end-user requirements and implements the process as specified by the end-user, process transformation from a business level to a technical level is necessary. As explained above this transformation is currently performed manually and can lead to information loss between the modeling levels. In addition to being error prone, redundant modeling activities can be expensive.

An annotation method for transformation of enterprise models to technical cross organizational business processes is provided in one embodiment of the invention. The method can be divided into three phases. The first phase provides an annotation framework to capture both semantic and relationships of models and notations. The second phase converts the actual model into a technical representation. The third phase reassembles the converted notations and systematically filters and adjusts the enterprise business process into a technical business process model.

The annotation framework is constructed of two building blocks. The first building block captures the semantic of all single elements while the second block records a relationship among elements.

An annotation framework used to capture the semantic of process models and graphical notations is described with reference to Tables 1-6. Enterprise modeling languages provide a wide variety of graphical notations that can be used to model a process or other domains of an enterprise. For this reason the entity class concept is introduced herein. An entity is defined as any single graphical notation that has no connection or edge character. Table 1 provides annotations for an entity class.

TABLE 1

Annotation Table for Entity Class

| ANNOTATION | VALUE TYPE |
|---|---|
| Enterprise ID | String |
| Type | Private Entity; View Entity |
| Name | String |
| Unique Name (ID) | String |
| Entity Semantic | String |
| Description | String |
| Connecting Model/Entity, Target (1) or Source (0) | String, Boolean |
| Enterprise Modeling Language | String |

The Enterprise ID annotation is defined for every entity, and is identical for all entities of the enterprise. The Entity annotation may either be a private or a view entity. The Name annotation captures the name of the actual entity. Because names of an entity may occur twice, each entity should to be equipped with a unique name ID annotation.

Process modeling languages provides a semantic for entities, therefore, the Entity Semantic annotates the semantic of that entity in a computational form. For user convenience, a description annotation may be provided. An entity may contain a reference to another model and, or entity that is not part of the actual model. Information about the connecting model or reference, as well as if that information is target or source (i.e. interfaces), can be stored in the Connecting Model/Entity (Target or Source) annotation. Finally the Enterprise Modeling Language annotation registers the enterprise modeling language used.

A private entity annotation is provided for private entities as a subclass of the entity class. Table 2 illustrates the annotations for a private entity.

TABLE 2

Annotation Table for Private Entity Class

| ANNOTATION | VALUE TYPE |
|---|---|
| Executable ICT (true/false) | Boolean |
| ICT System | String |
| Control Flow Entity (true/false) | Boolean |
| Control Flow Type | String |

The Executable ICT annotation focuses on those entities that can be executed with an ICT System. Entities that are executable within an ICT System are of high relevance for a technical business process. Allowable values are true or false. If an activity is annotated with "Executable ICT=true" the actual ICT System has to be specified in the ICT System annotation.

The Control Flow Entity annotation records if the entity is a control flow entity or not. This annotation is important to distinguish control flow entities in phase 2 from other entities.

Some enterprise modeling languages provide one holistic graphical notation with the same semantic for a control flow entities. But the actual control flow type of the control flow entity is not contained in the entities semantic but may be part of an annotation. For those cases the control flow type may be annotated in the Decision Type annotation.

A View Entity is a subclass of the entity class. View Entities are composed of private entities, as it will be seen in the relationship framework. Therefore no further annotations are necessary.

An edge is defined as a graphical notation that connects entities with a path. Table 3 provides annotations for Edge classes.

TABLE 3

Annotation Table Edge Class

| ANNOTATION | VALUE TYPE |
| --- | --- |
| Unique Name | String |
| Edge Semantic | String |
| Condition | String |
| Enterprise Modeling Language | String |

Each edge needs to have a Unique Name annotation for identification. Because enterprise modeling languages provide a certain semantic for an edge, the Edge Semantic annotation documents the actual semantic of the edge. Some edges may be associated with conditions that have to be fulfilled in order to activate the path. Therefore those conditions can be inserted into the Condition annotation. Finally the Enterprise Modeling Language annotation records the actual enterprise modeling language used.

A Process Class can be defined as any set of Entities and Edges to achieve a certain purpose. Table 4 illustrates annotations for Process Classes.

TABLE 4

Annotation Table Process Class

| ANNOTATION | VALUE TYPE |
| --- | --- |
| Type | String |
| Name | String |
| Unique Name (ID) | String |
| Description | String |
| Process Denotation | String |
| Process Conditions | String |
| Enterprise Modeling Language | String |

A process model can either be a CBP, process view, or private process as indicated in the Type annotation. Each process may have a unique name in the Name annotation. Besides the name, a Unique Name ID for each process must be provided. Optionally a description for each process may be provided in the Description annotation.

Process Modeling Languages may use different terms to Denote a process model. The most popular example may be the Unified Modeling Language (UML) where a process model can be created in an activity diagram. For each Process certain conditions may exits. Conditions defined for an overall process are utilized by entities that have an assignment for entity decision type. Finally, the Enterprise Modeling Language annotation indicates the actual used enterprise modeling language.

A CBP is a subclass of processes. Regarding the semantic framework no additional annotations are necessary.

The View Process is also a subclass of process and entails annotations for processes that are designated for collaboration and publication purpose; see Table 5 where an overall enterprise ID for process views is provided.

TABLE 5

Annotation Table Process View Subclass

| ANNOTATION | VALUE TYPE |
| --- | --- |
| Enterprise ID | String |

A private process class contains annotations for private processes. An overall Enterprise ID annotation for private processes is provided in Table 6.

TABLE 6

Annotation Table Private Process Class

| ANNOTATION | VALUE TYPE |
| --- | --- |
| Enterprise ID | String |

Figure 3:
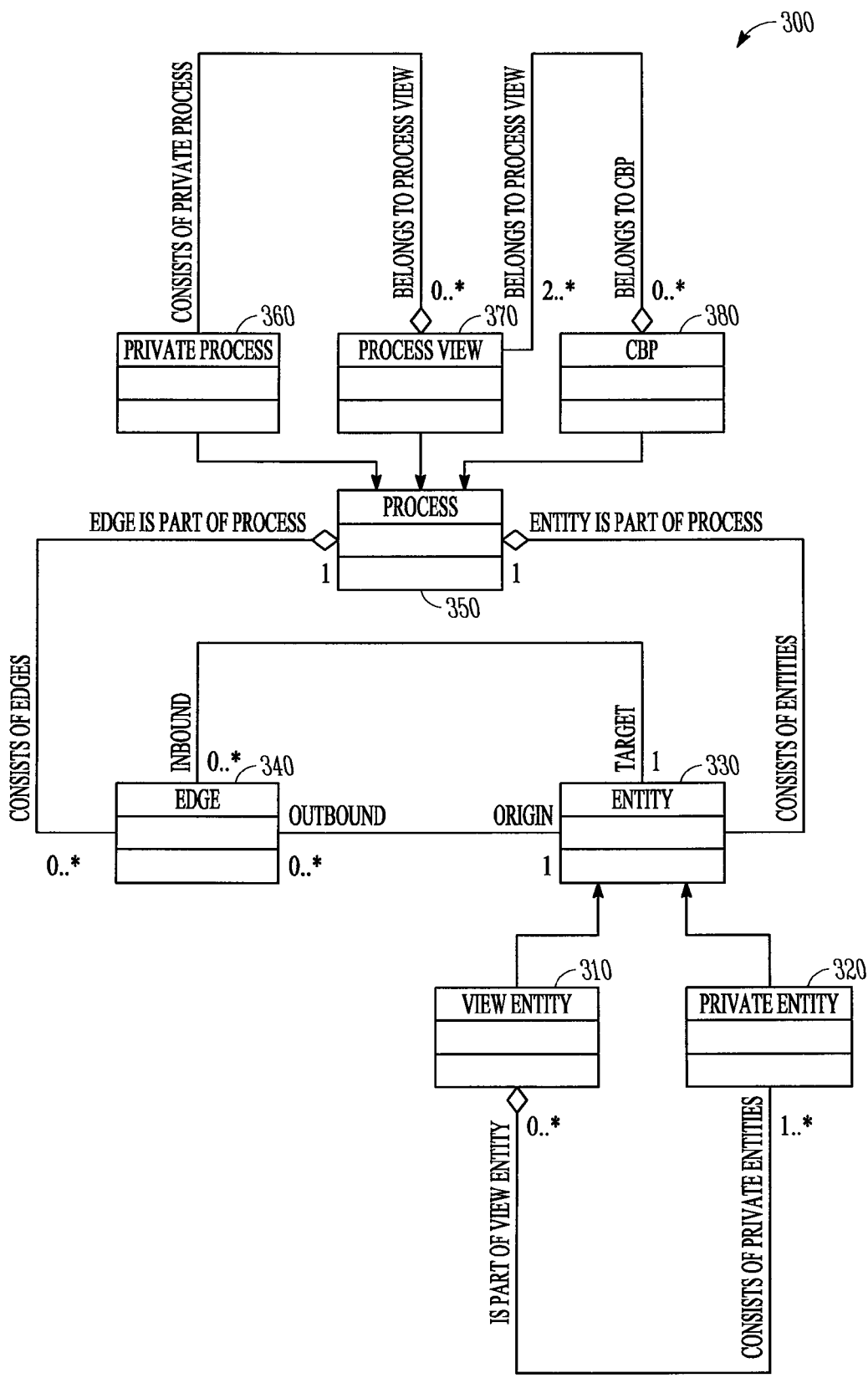
FIG. 3 is a UML class representation.

The first building block of the annotation framework, semantics, has been described. The second building block of the annotation framework captures the relationship that may occur among and between processes and entities within the cross-organizational business process (CBP) concept. Referring to FIG. 3, a UML (Unified Modeling Language) representation 3 of relationships within the Cross-Organizational Business Process Concept is provided. The representation 3 includes View Entities 310, Private Entities 320, Entities 330, Edges 340, Processes 350, Private Processes 360, Process Views 370 and CBP's 380. The following constraints are obeyed in the representation. A Private Entity 320 is only permitted within a private process 360. The Private Process 360 can only contain private entities 320. The View Entity 310 must not occur within a private process 360. A Process View 370 must not contain private entities 320.

For each instantiated object (entity 330, edge 340, or process 350) an annotation table is composed from the two major building blocks. The complete table is usually composed of the annotation from the associated class and subclass derived from the semantic annotation framework and an associated table of all relationships deriving from the relationship annotation framework. The table for the relationship has to be created individually based on the provided relationship model above.

Figure 4:
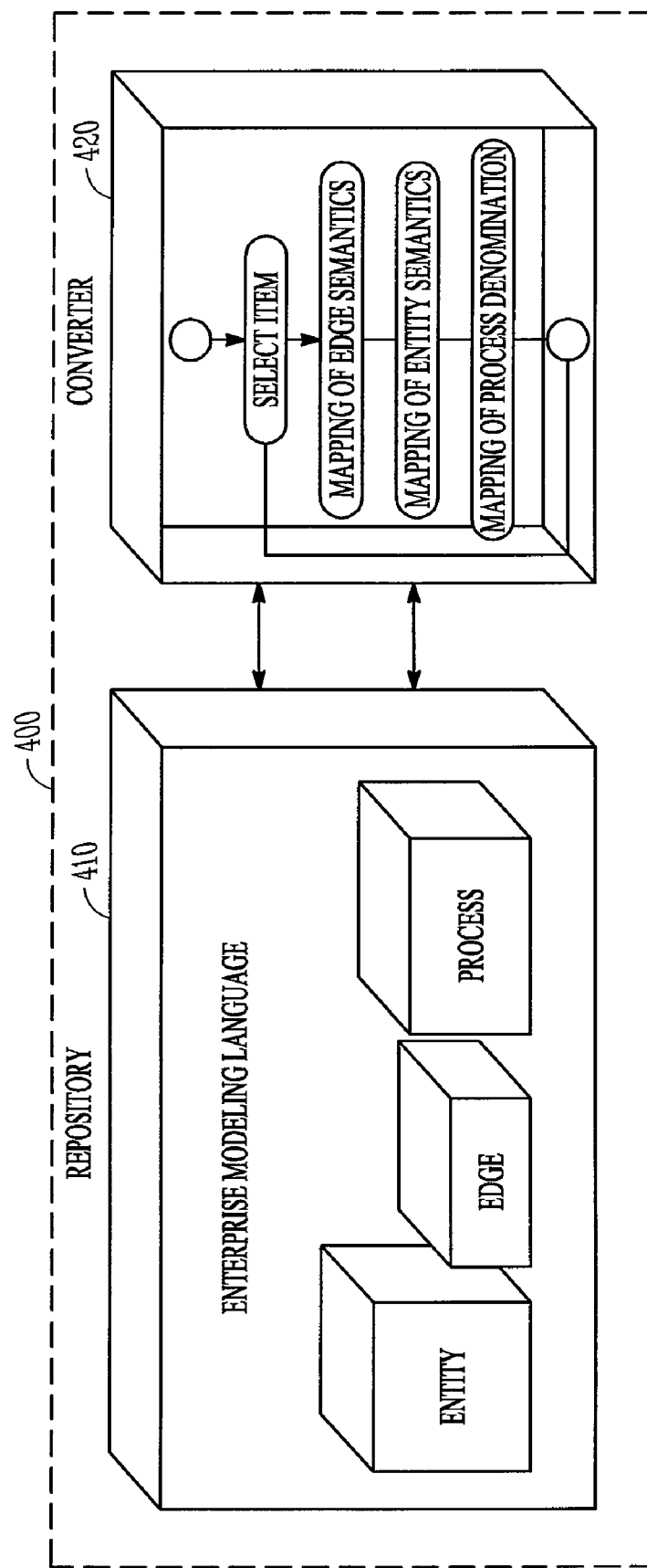
FIG. 4 illustrates a repository and converter modules.

Phase 2 converts entities, edges, and processes accordingly into a representation implementable at a technical level. Referring to FIG. 4 a Structure of a Model Converter 400 for implementing phase two includes a mapping repository 410 and a model converter 420. The purpose of the repository is to store mapping relations between entities, edges, and processes of enterprise modeling languages and their associated technical representation.

The procedure for the mapping repository starts with the creation of a list of entities that are available within an enterprise business process model and a list of entities allowed within a technical representation. The actual mapping between the entity semantics of both levels is then constituted. Since it may occur that some entities cannot be mapped to an entity, a 'NoTi' entity is provided. The term NoTi is short for "no technical representable item" and is a proxy for entities from an enterprise model where no mapping can be determined.

Figure 5:
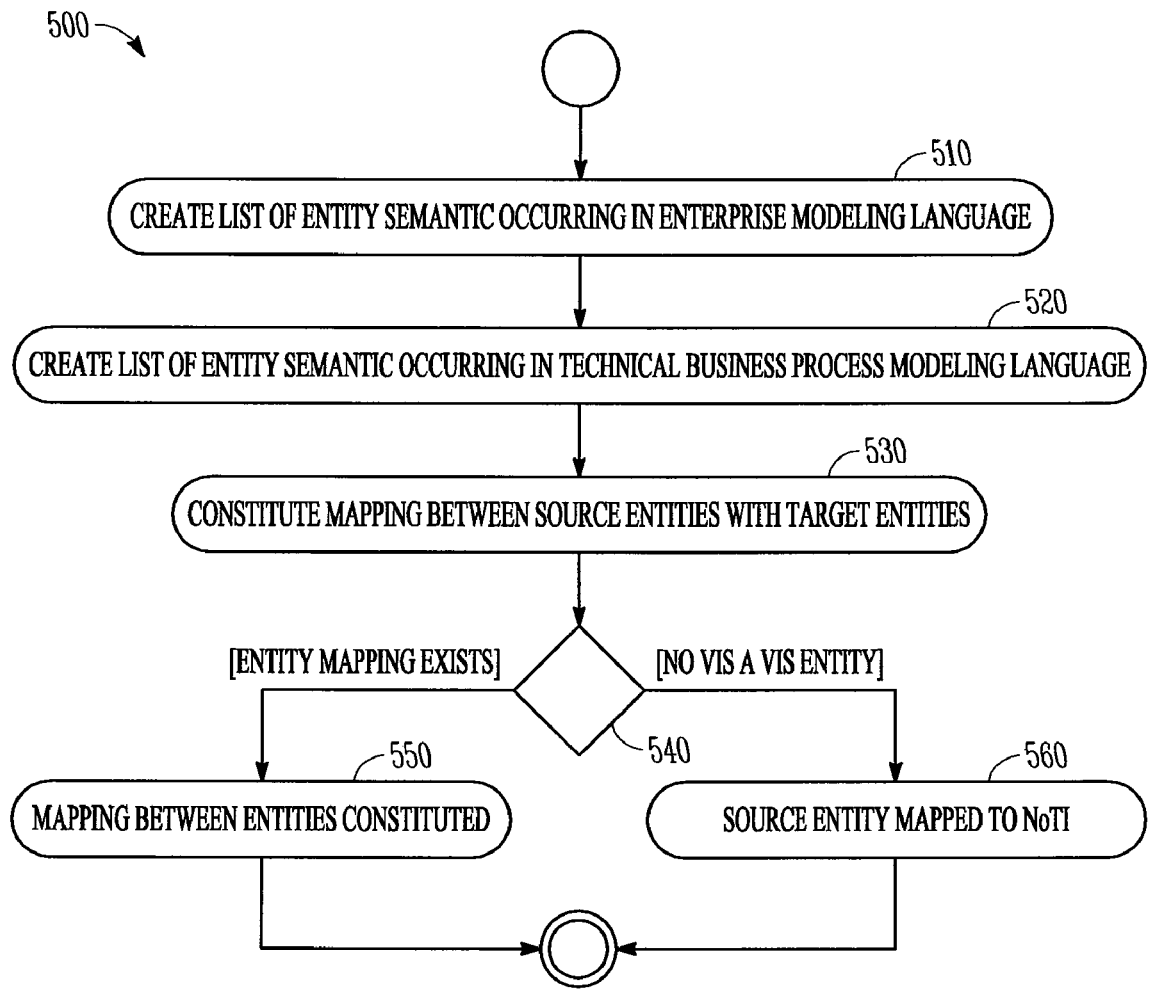
FIG. 5 is a flow chart of mapping repository for entity class.

FIG. 5 is a flow chart illustrating a set up process 500 for the Mapping Repository for Entity Class. At 510 a list of entity semantics occurring in an enterprise modeling language is created. A list of entity semantics occurring in a technical business process modeling language is created at 520. At 530 a mapping between source entities with target entities is constituted. A decision is made at 540 based on the existence of an entity mapping. If an entity mapping exits then mapping between entities is constituted at 550. If there is no corresponding entity the source entity is mapped to a NoTi status at 560.

Mapping of Entities that are annotated with control flow entity being "true" can be quite challenging. That is, a graphical notation with the semantic "and" provided within an enterprise business process may once have the semantic meaning "split" and once "sync." within a technical business process modeling language. To overcome this challenge it is suggested to examine all syntactically valid contingencies of that control flow entity and constitute a mapping to the according control flow entity in the technical business process modeling language. This approach can be computational operated through conditional statements like "If then else" statements.

Figure 6:
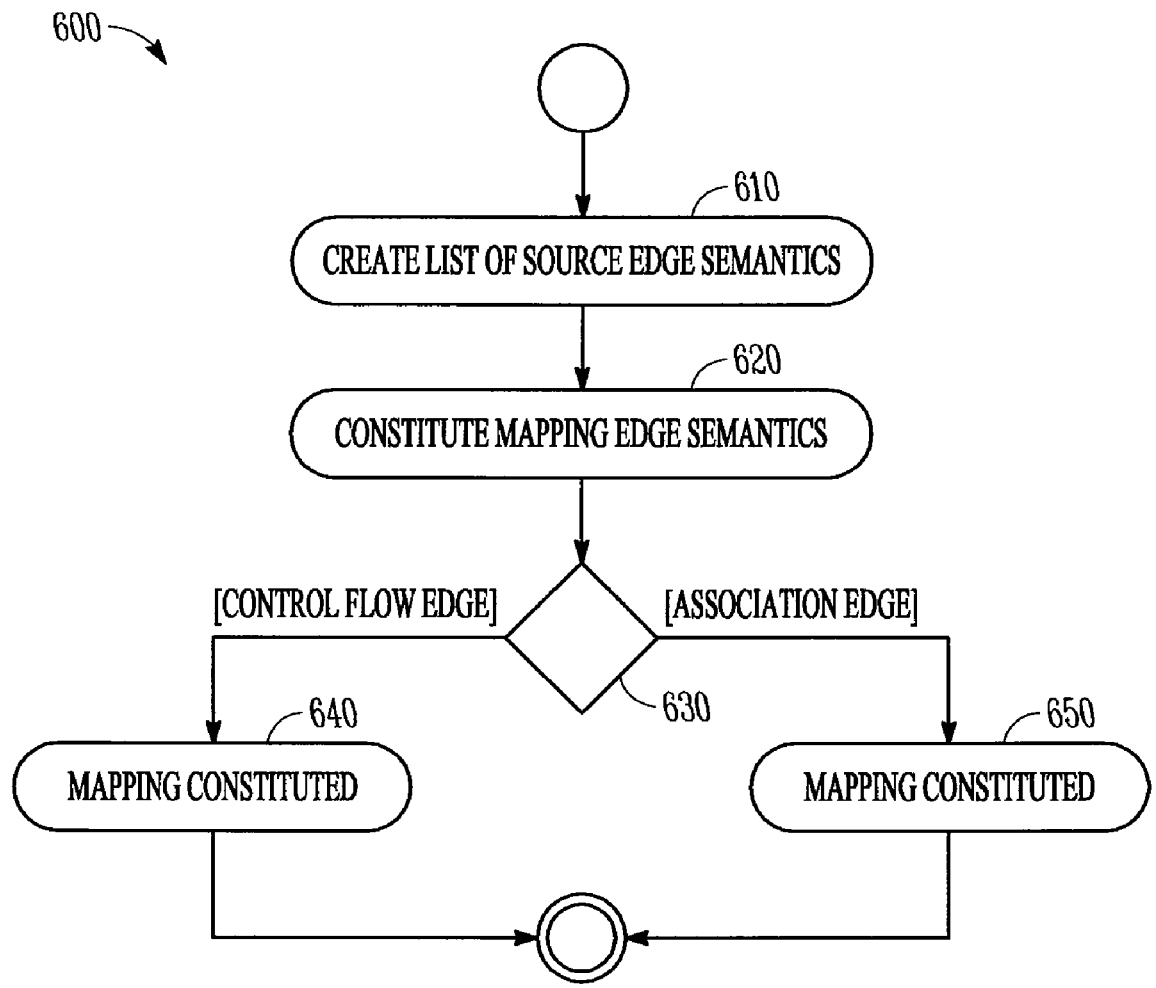
FIG. 6 is a flow chart of mapping repository for edges.

For edges an indirect approach is suggested. Basically two different types of edges can be identified, association edges (e.g. associating tasks with resources) and control flow edges describing the temporal sequence of tasks in a process. FIG. 6 illustrates a set up operation 6 for a Mapping Repository for Edges. At 610 a list of source edge semantics is created. Mapping of the edge semantics is constituted at 620. At 630 a determination of the edge is made. If the edge is a control edge mapping is constituted at 640. Similarly, if the edge is an association edge, the mapping is constituted at 650.

Some process modeling languages may provide a certain denomination for a process model. For example, a process is denoted as an Event-Driven Process Chain (eEPC) within the enterprise modeling language eEPC. Thus this repository stores the mapping between the different naming of an enterprise and technical business processes.

Figure 7:
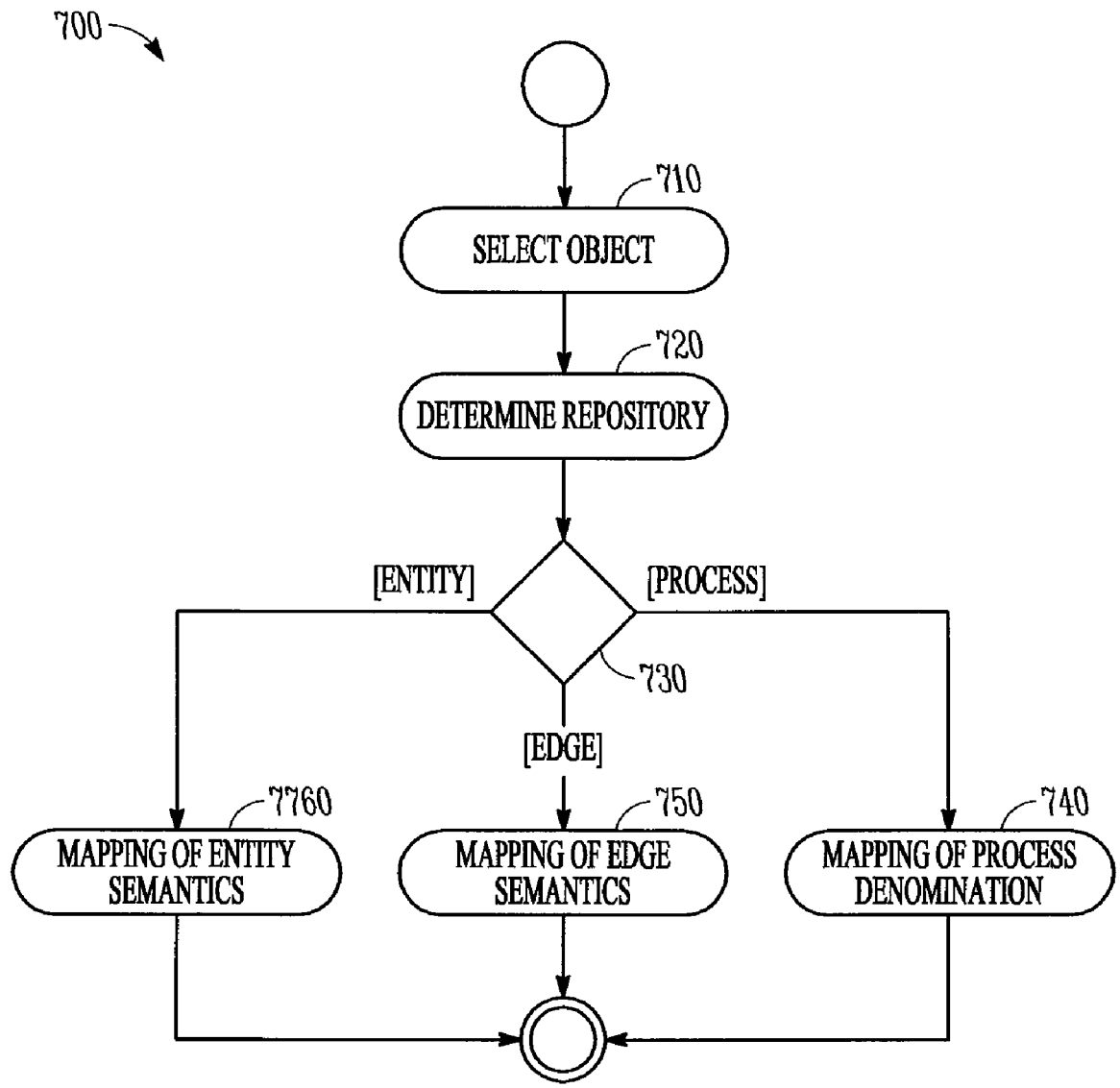
FIG. 7 is a flow chart illustrating the phases of a model converter.

The other segment of phase 2 is the model converter 420 illustrated in FIG. 4. The task of the model converter is to process the mapping. The converter selects each object individually, meaning either process, entity, or edge. Based on the annotated enterprise modeling language the associated repository will be determined. Converting is only conducted for the entity's semantic annotation to map it to the semantic of the technical business process modeling language. All other annotations will be preserved. After the mapping has been conducted each entity is semantic to conform to technical business process models. FIG. 7 illustrates a flow chart for the operation 700 of the Model Converter. At 710 an object is selected and the appropriate repository is determined at 720. A decision is made at 730 based upon the object type. If the object is an entity the semantics are mapped at 760, if the object is an edge the semantics are mapped at 750, and if the object is a process the semantics are mapped at 740.

The purpose of phase 3 is to reassemble the single objects into technical business process and to adjust to a syntactically valid representation. Phase 3 includes four single procedures. The first procedure of phase 3 is to reassemble all objects into a technical business process model. First processes have to be created and then all entities and edges are assigned to their according process.

Figure 8:
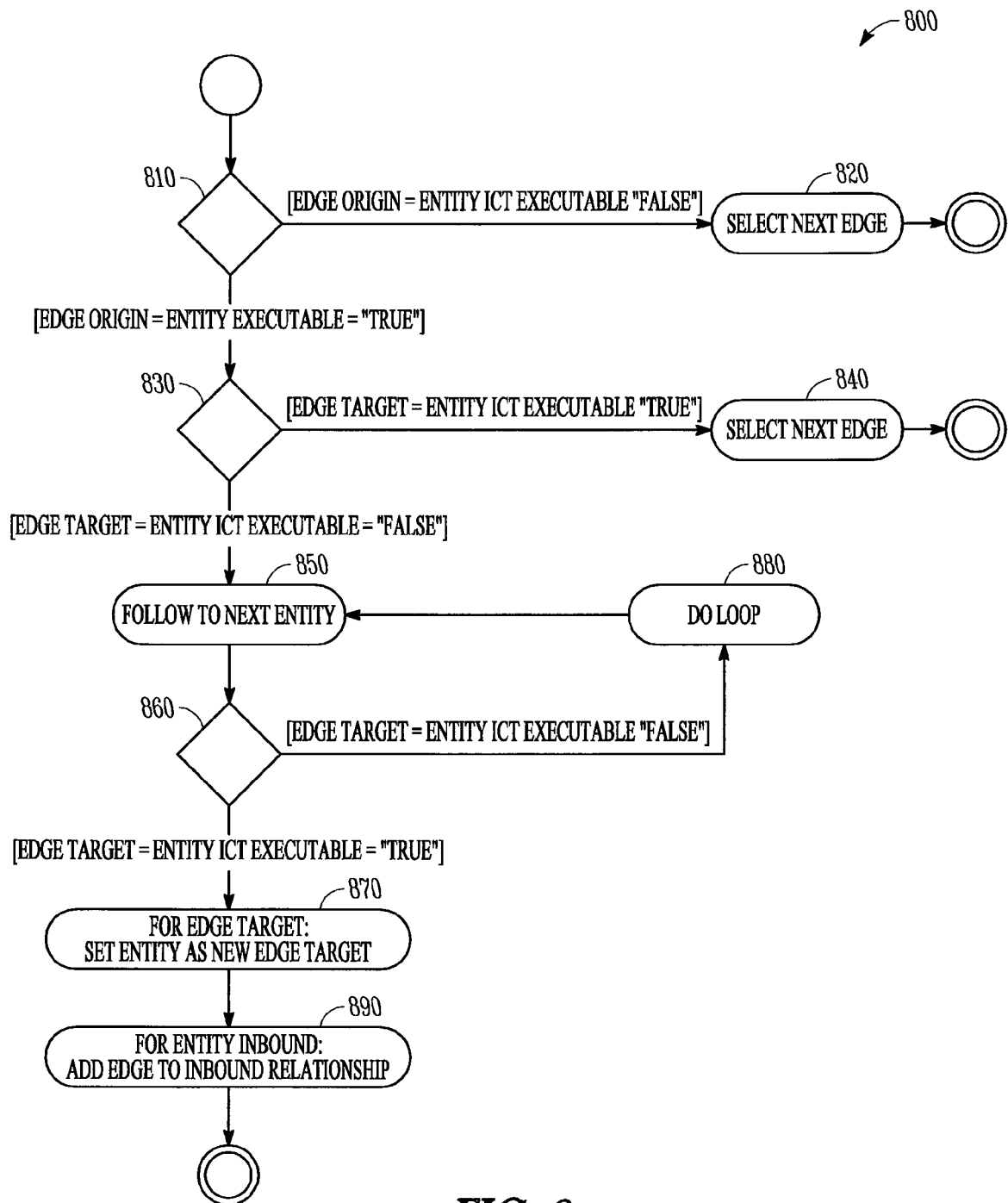
FIG. 8 illustrates an extended edges algorithm.

After the first activity, the technical business process model still contains entities that are not executable within an ICT system. But before sorting out non ICT executable entities, direct connections between entities that are executable within an ICT system should be established. To establish such a direct connection an extended edge algorithm has been developed. FIG. 8 illustrates one embodiment of an Extend Edge Algorithm 800. The extended edge algorithm proofs if a control flow edge connects two entities that are both annotated ICT executable as true. If an edge does not connect two such entities, the path(s) are continued until an ICT executable entity is reached.

At 810 it is determined if an edge origin is executable. If it is not executable then the next edge is selected at 820. If the edge is executable, a determination is made at 830 to determine if the target edge is executable. If it is executable the next edge is selected at 840. If the target edge is not executable the algorithm follows to the next entity at 850. If the edge is not executable at 860 a loop is performed at 870 until an executable edge is reached. When an executable edge is reached, for the edge target the entity is set as a new edge target at 880. For the entity inbound the edge is added to an inbound relationship at 890.

In order to achieve a valid technical representation of a technical business process the following objects should be filtered and sorted out: all non association edge edges, all edges that do not connect two entities that are ICT executable as true and all entities that are ICT executable as false. Furthermore, all relationship annotations have to be updated for the remaining objects.

The last activity of phase three is to examine the technical compliance of the technical business process model. A technical compliance handler provides routines and procedures to proof the syntax validity and adjusts accordingly. For example, a technical business process model may require a start and end operator for each process that may not be considered within an enterprise model. However, technical business processes are specific to the underlying semantic of the technical level. Therefore routines have to be developed individually depending on the specific requirements.

Figure 9:
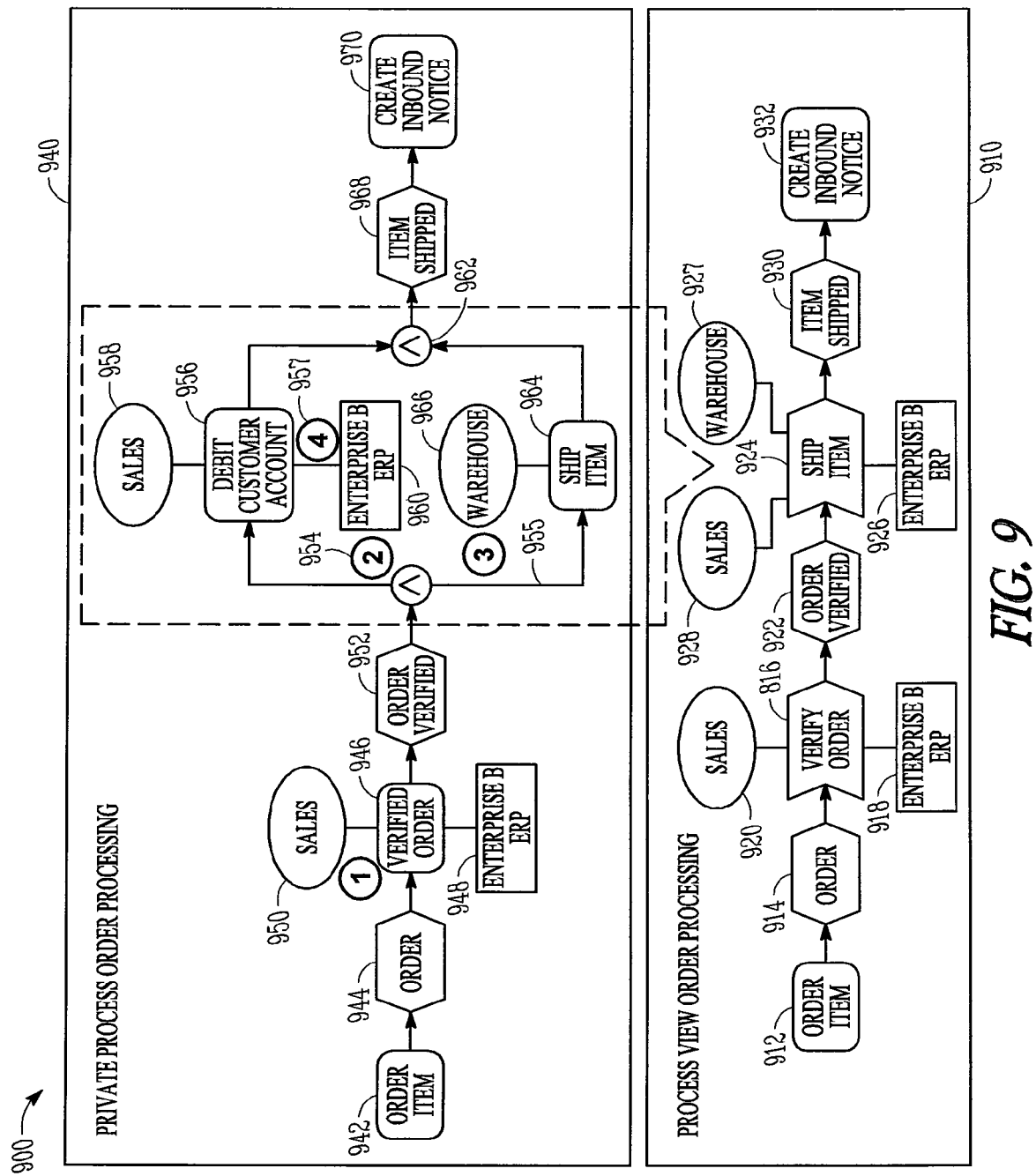
FIG. 9 illustrates an example process view and private process for Enterprise B.

A brief example for the application of the above-described method is provided as follows. A private enterprise business process 940 and a corresponding process view 910 are modeled 9 in the eEPC language as illustrated in FIG. 9.

Process view order processing 910 includes numerous processes. Item order process 912 leads to an order 914. The order is verified 916 and associated with sales 920 and Enterprise B ERP 918. Order verified 922 leads to ship item 924 which is associated with processes sales 928, warehouse 927 and Enterprise B ERP 926 (application system). Item shipped process 930 leads to creating an inbound notice 932.

Private Process order processing 940 includes numerous processes. Item order process 942 leads to an order 944. The order is verified 946 and associated with sales 950 and Enterprise B ERP 948. Order verified 952 leads to AND junction 954 which leads to both debit customer account 956 and ship item 964. Ship item process is associated with warehouse 966. While debit customer account is associated with sales 958 and Enterprise B ERP 960. Item shipped process 968 leads to creating an inbound notice 970.

A primary task of the example is to annotate and transform the enterprise business process into a technical business process representation. The example is not intended to reflect a possible software implementation but is provided in order to foster a better understanding of the method.

First, Phase 1 applies the Annotation Framework described above. The application of the annotation framework should be exemplified for two objects, an entity "Verify Order" (1) and a control flow entity (2). Table 7 illustrates the Annotation Table for the Private Entity "Verify Order".

TABLE 7

Annotation Table for Private Entity "Verify Order"

Annotation Framework Semantics
Annotations derived from entity class

| ANNOTATION | VALUE TYPE |
|---|---|
| Enterprise ID | Enterprise B |
| Type | private entity |
| Name | verify order |
| Unique Name (ID) | Private.Entity.Verify.Order |
| Entity Semantic | Function |
| Description | / |
| Connecting Model/Entity, Target (1) or Source (0) | / |
| Enterprise Modeling Language | EEPC |

Annotations derived from subclass private entity

| ANNOTATION | VALUE |
|---|---|
| Executable ICT (true/false) | True |
| ICT System | / |
| Control Flow Entity | False |
| Decision Type | No |

Annotation Framework Relationships
Annotations that derive from relationship

| ANNOTATION | VALUE |
|---|---|
| Inbound | Edge_Order_Verify.Order; [list] |
| Outbound | Edge_Verify.Order_Order.Verified; [list] |
| Entity is part of view entity | View.Entity.Verify.Order |
| Entity is part of process | Private.Process.Order.Processing |

Table 7 reflects the entire annotation table for the entity of type private entity named "verifies order." The entire table consists of the annotation building blocks that are derived from the semantic framework entity class and private entity subclass as well as from the annotations derived from the relationship framework. Regarding the entire table some important annotations should be highlighted. The semantics of the graphical notation within the enterprise modeling language eEPC is function. The connection to the application system "Enterprise B ERP" indicates that this function is executed by an ICT system, therefore it has to be annotated with ICT executable as true. Annotation extracts regarding the relationship framework are listed within the according columns but still needs to be amended for completion.

The Annotation extract of Table 8 refers to the control flow entity "and" 954, see FIG. 9, within the private process 940. The entity's semantics is And. It is to point out that all control flow entities should be transitively annotated with executable ICT as true, since they are representable within a technical business process model.

TABLE 8

Annotation Extract for Private Entity "Control Flow And"
ANNOTATION FRAMEWORK SEMANTICS

| ANNOTATION | VALUE TYPE |
|---|---|
| Entity Semantic | And |
| Executable ICT (true/false) | True |
| ICT System | / |

The next step is to set up a repository for entities, edges, and processes as explained above. A brief extract shows how the final repository for entities and control flow entities may look like.

A function can be mapped to an activity within Maestro and thus constitutes a clear mapping. However, an entity event (for example Order 946, Order Verified 952, and Item Shipped 968 of FIG. 9) has no corresponding entity within Maestro and thus will be mapped to the proxy entity NoTi.

TABLE 9

Mapping Repository Extract for Entities of eEPC with Maestro
Mapping Table for Entities of eEPC and Maestro

| Entity semantic in eEPC | Entity semantic in Maestro |
|---|---|
| Function | Activity |
| Event | NoTi |
| [list] | [list] |

The following example if-then-else statement represents a conditional mapping of the control flow entity "and" 954 as it has been developed based on an examination of all syntactically valid contingencies.

If control flow entity has inbound edges >1 then
  If control flow entity has outbound edges >1 then
    mapping of control flow entity in Maestro=synchronize+edge+fork
  Else
    mapping of control flow entity in Maestro=synchronize
Else if control flow entity has outbound edges >1 then
  mapping of control flow entity in Maestro=fork
Else
  Error Edges 955 and 957 in FIG. 9 should point out the difference between a control flow and an association edge. Edge 955 has the semantics "activates" and establishes a connection between the "and" operator 954 and the function ship item 964. Thus it describes a temporal ordering of tasks in the process and is to map as a control flow edge. Edge 957 has the semantics "supports" and depicts a static connection between the application system (Enterprise B ERP) 960 and the function "debit customer account" 956. Thus it is annotated as association edge. For all edge semantics and their characteristics a repository has to be established as explained above.

The repository for processes should be produced equally to the entity repository. The work of the mapping converter in Phase 2 is comprehensively described above.

The first step of phase three is to reassemble all objects. In the example, the private process order processing 940 gets reassembled within Maestro and creates the tentative technical business process 1000 illustrated in FIG. 10. The tentative technical business process includes item order process 1010 that leads to an order 1020. The order is verified 1022 and associated with sales 1026 and the application system Enterprise B ERP 1024. Order verified 1028 leads to fork 1030 which leads to both debit customer account 1042 via edge 1033 and ship item 1034 via edge 1032. Ship item process is associated with warehouse 1036. While debit customer account is associated with sales 1050 via edge 1048 and application system 1044 via edge 1046. synchronize 1040 combines the edges 1038 and 1039 to Item shipped process 1052 resulting in creating an inbound notice from a sender 1054.

Entities 1010, 1020, 1024, 1026, 1034, 1036, 1044, 1050, 1052 and 1054 are entities that have been annotated as ICT executable=false. Edges 1025 and 1027 have been converted as non transitive edges. Entities 1022 and 1042 are annotated ICT executable=true as well as fork 1030 and sync 1040s, which represent a control flow entity within Maestro.

Figure 10:
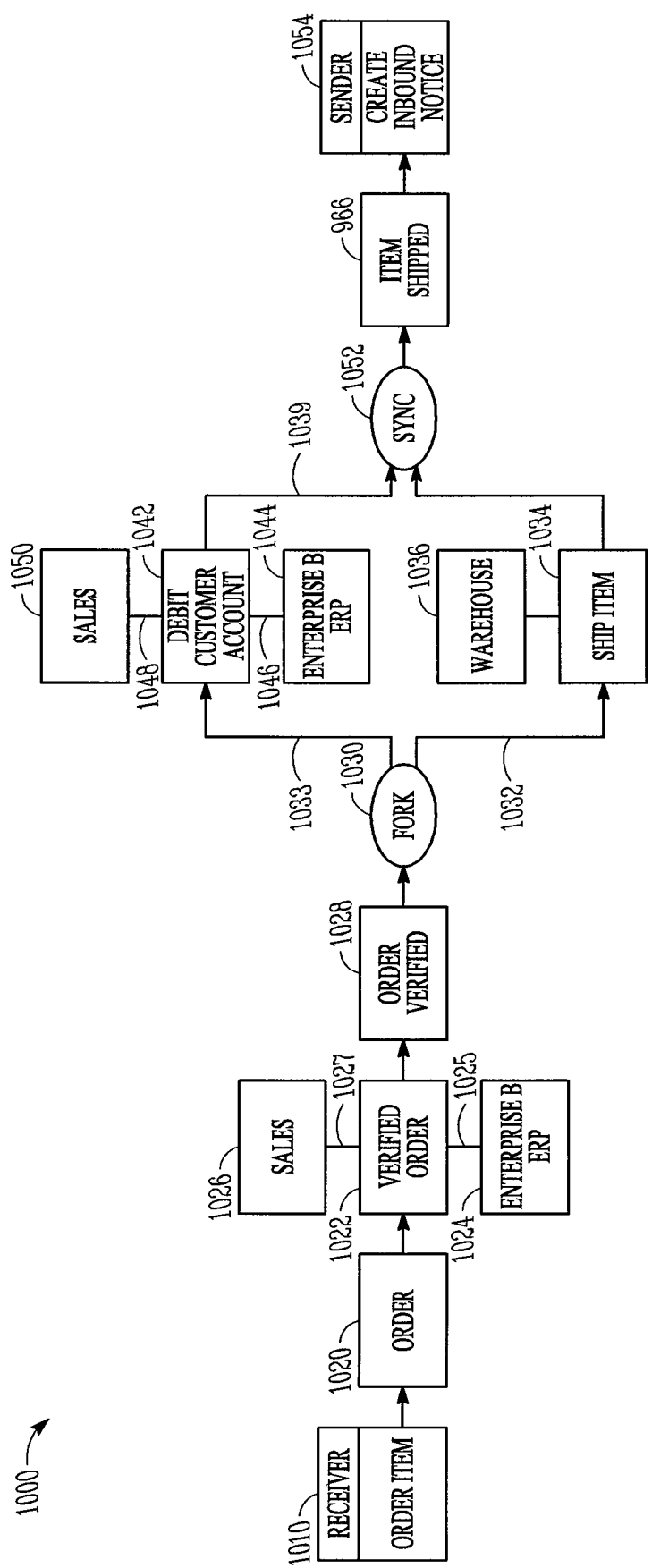
FIG. 10 is a transitive technical business model.

The extended edge algorithm is exemplified for the path that includes edges 1032 and 1038 within FIG. 10. Since the fork operator 1030 is ICT executable as true the algorithm continues the path of a transitive edge to the next entity. Since the entity ship item 1034 has been annotated as ICT executable as false the algorithm follows the path to the next entity. Since the next entity is an operator 1040 the edge's target gets updated within its annotations as well as the annotations of the other entities (i.e. sync operator 1040) gets adjusted accordingly.

Figure 11:
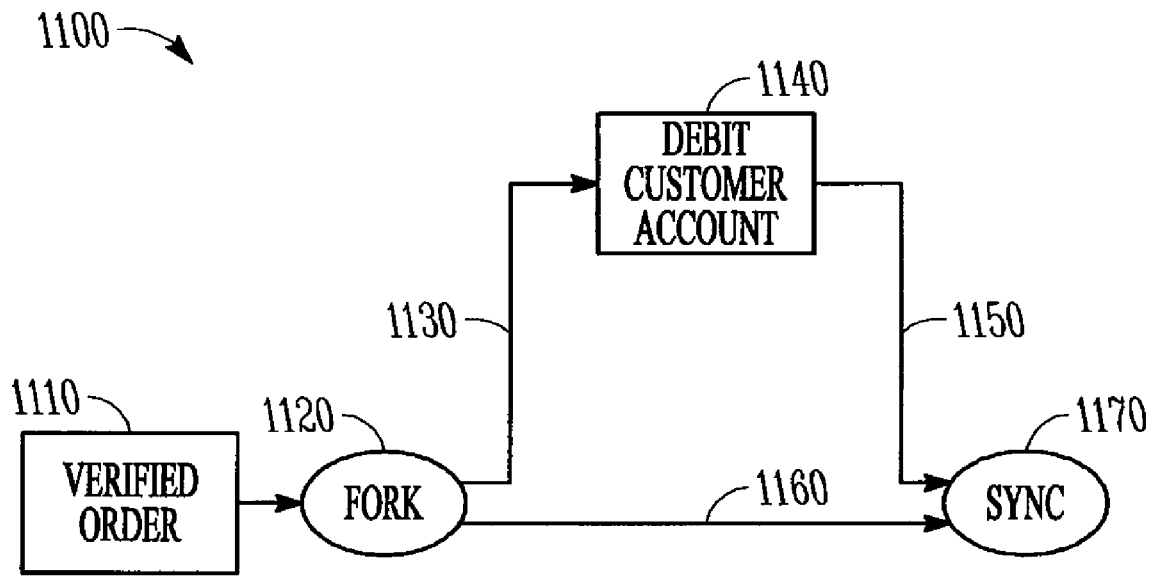
FIG. 11 is the model of FIG. 10 after filtering.

After filtering and sorting out not necessary objects the actual technical business process model 1100 (in a tentative state) is illustrated in FIG. 11. The model includes verify order 1110, fork 1120, edge 1030, debit customer account 1140, edge 1150, edge 1160 and sync 1170. After removing the entities and edges, the annotations also get removed from the according entities.

Figure 12:
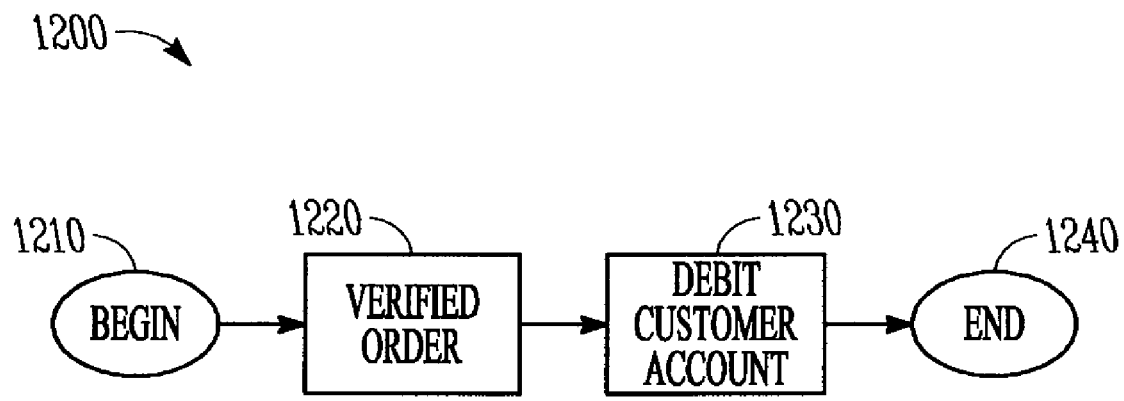
FIG. 12 is a final technical business process model.

The compliance handler provides routines to check the overall model validity. Routines have to be developed that are specific to certain technical requirements. Maestro requires for processes to be executable that processes start with a start and end with and end operator. Thus the model has to be extended by those operators. Empty paths such as the parallel paths 1130/1150 and 1160, as shown in FIG. 11, can be removed to simplify the process model. The final technical business process model 12 is depicted in FIG. 12 with a beginning 1210, verify order 1220, debit customer account 1230 and an ending 1240. As such the model of FIG. 9 has been transformed into the technical model of FIG. 12.

The other processes, view entities etc. have to be created the same way as it has been exemplified above. The relationships between and among entities, edges and processes is preserved and updated within the annotation framework during the entire method. Thus by looking up the annotations of a single entity within a technical business process model it is possible to determine to which view entity a private entity belongs and in turn to which view process such a view entity belongs.

Figure 13:
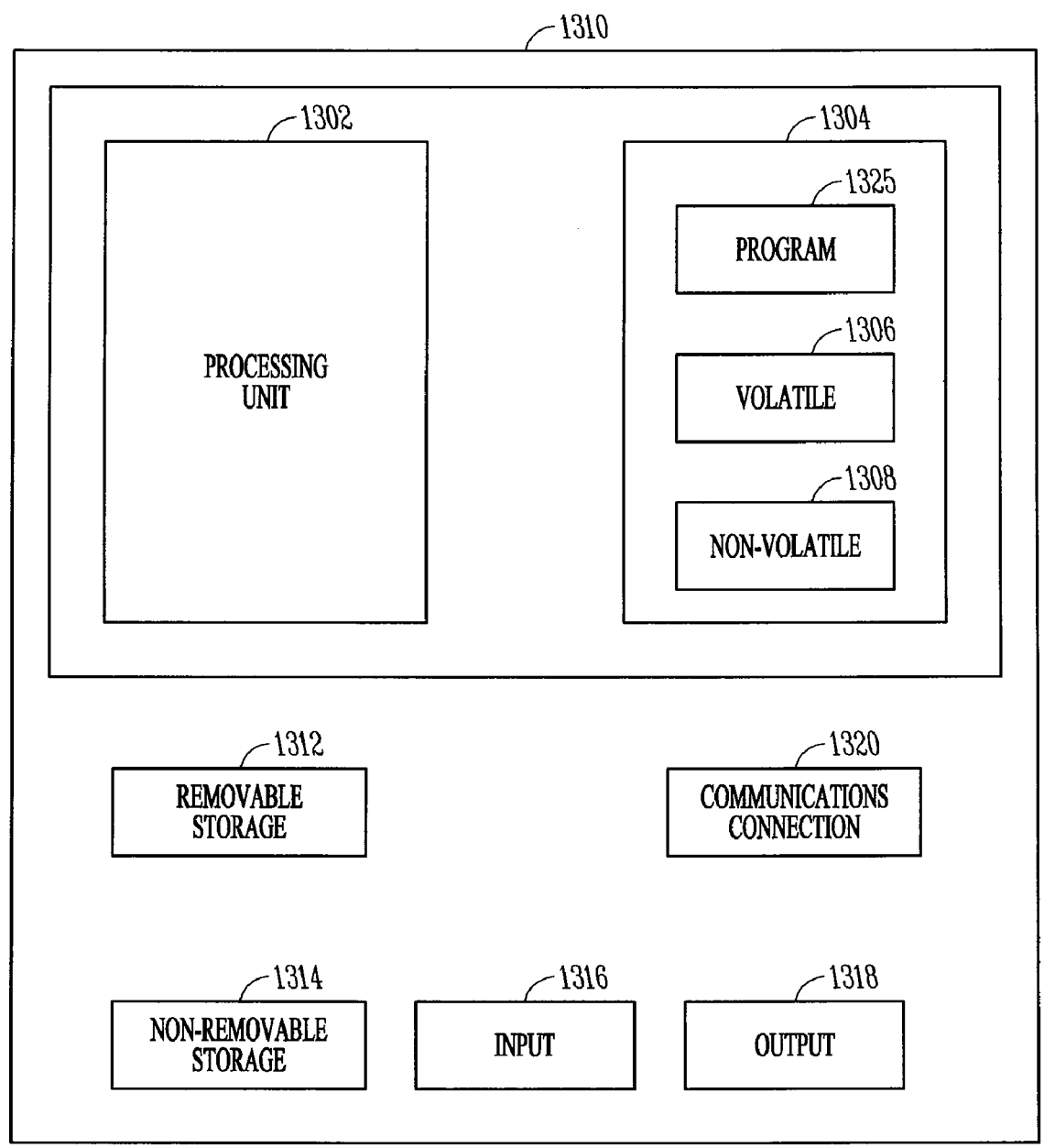
FIG. 13 is an example embodiment of a computer system upon which embodiments of the present invention may execute.

A block diagram of a computer system that executes programming for performing the above functions is shown in FIG. 13. In one embodiment, multiple such computer systems are utilized in a distributed network to implement multiple components in a transaction based environment. An object oriented architecture may be used to implement such functions and communicate between the multiple systems and components. One example computing device in the form of a computer 1310, may include a processing unit 1302, memory 1304, removable storage 1312, and non-removable storage 1314. Memory 1304 may include volatile memory 1306 and non-volatile memory 1308. Computer 1310 may include—or have access to a computing environment that includes—a variety of computer-readable media, such as volatile memory 1306 and non-volatile memory 1308, removable storage 1312 and non-removable storage 1314. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1310 may include or have access to a computing environment that includes input 1316, output 1318, and a communication connection 1320. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1302 of the computer 1310. A hard drive, CD-ROM, and RAM are some examples of articles including a computer-readable medium. The computer-readable instructions allow computer 1310 to provide generic access controls in a COM based computer network system having multiple users and servers.

It should be appreciated that reference throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment. Furthermore, the particular features, structures or characteristics may be combined as desired in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the inventions require more features than are expressly recited in each claim that issues from this provisional application. Rather, inventive aspects lie in less than all features of a single foregoing disclosed embodiment, and each embodiment described herein may contain more than one inventive feature.

While the invention has been particularly shown and described with reference to various embodiments thereof, it will be understood by those skilled in the art that various other changes in the form and details may be made without departing from the spirit and scope of the invention.

What is claimed is:

1. A transformation method comprising:
   using one or more processors to perform at least a portion of at least one of the following acts:
   performing an annotation of a business model in an enterprise modeling language to capture semantics of entities of the business model, the performing of the annotation comprising annotating entities, edges and processes of the business model, the entities comprising private entities and public view entities, the annotation for the entities comprising an Enterprise identification, an entity Type, a Name, a Unique Name, an Entity Semantic, a Description, a Connecting Model/Entity, and an Enterprise Modeling Language annotation;
   performing a conversion operation of the annotated entities into a corresponding entity of a technical model, the technical model represented by one or more activities executable within an associated information and computing technology (ICT) system, the conversion operation comprising:
   preserving the captured semantics of the entities, and
   transforming the entities into a representation implementable at the technical model; and reassembling the converted entities into a cross-organizational business process in a desired technical modeling language.

2. The method of claim 1 wherein the private entities are further annotated with an executable information and computing technology (ICT), an ICT System, a Control Flow Entity, and a Control Flow Type annotation.

3. The method of claim 1 wherein the edges are annotated with a Unique Name, an Edge Semantic, a Condition and an Enterprise Modeling Language annotation.

4. The method of claim 1 wherein the processes comprise public view processes and private processes.

5. The method of claim 4 wherein the processes are annotated with a Type, a Name, a Unique Name, a Description, a Process Denotation, a Process Conditions and an Enterprise Modeling Language annotation.

6. The method of 5 wherein the public view processes and private processes are further annotated with an Enterprise ID annotation.

7. A transformation method comprising:
using one or more processors to perform at least a portion of at least one of the following acts:
performing an annotation of a business model in an enterprise modeling language to capture semantics of entities of the business model, wherein performing the annotation comprises annotating entities, edges and processes of the business model,
the annotation for the entities comprises an Enterprise identification, an entity Type, a Name, a Unique Name, an Entity Semantic, a Description, a Connecting Model/Entity, and an Enterprise Modeling Language annotation,
the edges are annotated with a Unique Name, an Edge Semantic, a Condition and the Enterprise Modeling Language annotation,
the processes are annotated with a Type, a Name, a Unique Name, a Description, a Process Denotation, a Process Conditions and the Enterprise Modeling Language annotation;
performing a conversion operation of the annotated entities into a corresponding entity of a technical model, the technical model represented by one or more activities executable within an associated information and computing technology (ICT) system, the conversion operation comprising:
preserving the captured semantics of the entities, and
transforming the entities into a representation implementable at the technical model; and
reassembling the converted entities into a cross-organizational business process in a desired technical modeling language.

8. A computer readable medium having tangibly stored instructions for causing a computer to perform a method comprising:
performing an annotation of a business model in an enterprise modeling language to capture semantics of entities of the business model, the performing of the annotation comprising annotating entities, edges and processes of the business model, the entities comprising private entities and public view entities, the annotation for the entities comprising an Enterprise identification, an entity Type, a Name, a Unique Name, an Entity Semantic, a Description, a Connecting Model/Entity, and an Enterprise Modeling Language annotation;
performing a conversion operation of the annotated entities into a corresponding entity of a technical model, the technical model represented by one or more activities executable within an associated information and computing technology (ICT) system, the conversion operation comprising:
preserving the captured semantics of the entities, and
transforming the entities into a representation implementable at the technical model; and
reassembling the converted entities into a cross-organizational business process in a desired technical modeling language.

9. The computer readable medium of claim 8 wherein the private entities are further annotated with an executable information and computing technology (ICT), an ICT System, a Control Flow Entity, and a Control Flow Type annotation.

10. The computer readable medium of claim 8 wherein the edges are annotated with a Unique Name, an Edge Semantic, a Condition and an Enterprise Modeling Language annotation.

11. The computer readable medium of claim 8 wherein the processes comprise public view processes and private processes.

12. The computer readable medium of claim 11 wherein the processes are annotated with a Type, a Name, a Unique Name, a Description, a Process Denotation, a Process Conditions and an Enterprise Modeling Language annotation.

13. The computer readable medium of claim 12 wherein the public view processes and private processes are further annotated with an Enterprise ID annotation.

14. A system comprising:
a memory; and
one or more processors configured to implement:
a module to annotate a business model in an enterprise modeling language to capture semantics of entities of the business model, the module to annotate entities, edges and processes of the business model, the entities comprising private entities and public view entities, the module to annotate the entities to include an Enterprise identification, an entity Type, a Name, a Unique Name, an Entity Semantic, a Description, a Connecting Model/Entity, and an Enterprise Modeling Language annotation,
a converter to perform a conversion operation of the annotated entities into a corresponding entity of a technical model, wherein the conversion operation preserves the captured semantics of the entities and transforms the entities into a representation implementable at the technical model, and
a module to reassemble the converted entities into a cross-organizational business process in a desired technical modeling language.

* * * * *

UNITED STATES PATENT AND TRADEMARK OFFICE
CERTIFICATE OF CORRECTION

PATENT NO. : 7,657,411 B2 Page 1 of 1
APPLICATION NO. : 11/333911
DATED : February 2, 2010
INVENTOR(S) : Poetsch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 959 days.

Signed and Sealed this

Twenty-eighth Day of December, 2010

David J. Kappos
*Director of the United States Patent and Trademark Office*